IMPROVED MICROWAVE OSCILLATOR TUNING MEANS

Filed April 7, 1965 2 Sheets-Sheet 1

INVENTOR
Benjamin F. Gregory
BY
Blair & Buckles
ATTORNEYS

Dec. 20, 1966 B. F. GREGORY 3,293,566

IMPROVED MICROWAVE OSCILLATOR TUNING MEANS

Filed April 7, 1965 2 Sheets-Sheet 2

INVENTOR
Benjamin F. Gregory
BY
Blair & Buckles
ATTORNEYS

United States Patent Office 3,293,566
Patented Dec. 20, 1966

3,293,566
IMPROVED MICROWAVE OSCILLATOR TUNING MEANS

Benjamin F. Gregory, Tampa, Fla., assignor to Trak Microwave Corporation, Tampa, Fla.

Filed Apr. 7, 1965, Ser. No. 446,378
9 Claims. (Cl. 331—98)

This application is a continuation-in-part of my copending application for "X-Band Oscillator," Serial No. 331,527 filed December 18, 1963 and assigned to the assignee of the present application.

The present invention relates to microwave devices having distributed parameter circuits. More particularly, it relates to a microwave source of the type described and claimed in my above-noted copending application which is tunable over a wide X-band frequency range.

The vacuum tube microwave oscillator disclosed in my copending application, Serial No. 331,527, includes a tapered plate line connected to the plate of the vacuum tube and arranged coaxially within a cylindrical outer shell. The outer shell is electrically coupled to the cathode of the vacuum tube. A cylindrical grid sleeve, electrically connected to the grid of the tube and disposed coaxially between the plate line and the shell, defines a grid-cathode coaxial line and a grid-plate coaxial line. A sliding line, affixed to and movable with a tuning choke assembly, is slotted at its free end to form a plurality of resilient fingers. The resilient fingers of the sliding line ride over the tapered surface of the plate line as the tuning choke assembly and sliding line are moved axially to frequency tune the oscillator.

As the oscillator is tuned down in frequency, the resilient fingers of the sliding line are spread radially outward through coaction with the tapered surface of the plate line. The distributed electrical capacity of the grid-plate line, and particularly the lumped capacity concentrated at the free end of the cylindrical grid sleeve, are significantly increased due to the reduced radial spacing between the outer surface of the resilient fingers and the end of the grid sleeve. Since the resonant frequency of any resonant electrical circuit is inversely proportional to its capacitance, the operating frequency of the oscillator is lowered to a greater extent than is possible in devices not equipped with this cooperative tapered plate line-sliding line construction.

Conversely, axial movement of the tuning choke assembly and sliding line in the opposite direction increases the operating frequency of the oscillator. The resilient fingers of the sliding line, riding downwardly along the tapered surface of the plate line, converge radially to increase the radial separation between the outer surface of the resilient fingers and the cylindrical grid sleeve. The distributed electrical capacity of the grid-plate coaxial line is decreased as is the lumped capacity at the free end of the grid sleeve, and the resonant frequency of the source is thereby increased.

Although the oscillator of my above-noted copending application embodying the structural features outlined above produces a wide range of tunable frequencies, it is particularly desirable to be able to frequency tune such an oscillator over as wide a frequency range as possible. It is also desirable to increase the rate of frequency change in response to movement of the tuning choke in order that the oscillator may be tuned to different frequencies more rapidly.

It is an object of the present invention to provide a microwave source capable of operating at X-band frequencies.

It is a further object of my invention to provide an oscillator of the above character which employs a vacuum tube as the active element.

A still further object of my invention is to provide a microwave oscillator of the above character which is tunable over a wide X-band frequency range.

A yet further object is to provide a microwave oscillator of the above character which is mechanically tunable over a wide frequency range.

An additional object is to provide a microwave oscillator of the above character which is rapidly tunable over a wide range of X-band frequencies.

A further object is to provide a microwave oscillator of the above character which is of small size, light weight, rugged construction, simplified design and readily manufactured.

Other objects of my invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Similar reference numerals refer to corresponding parts throughout the several views of the drawings.

Broadly stated, the essential features of my present invention reside in the substitution of a tapered or truncated conical shaped grid sleeve for the cylindrical grid sleeve of my above-noted copending application. In addition, the free ends of the resilient fingers of the sliding line member are formed with radially outwardly extending knobs which coact with the free end of the conical grid sleeve to accentuate the lumped capacity therebetween.

In one embodiment of my invention, the plate line on which the resilient fingers of the sliding line ride is formed having a cylindrical surface configuration rather than the tapered surface configuration of my copending application. Consequently, the resilient fingers of the sliding line riding over the outer surface of the plate line member are not forced radially inward and outward. The desired effect of increasing the lumped capacity at the free end of the grid sleeve is still achieved by virtue of the conical shaping of the grid sleeve and the radially outwardly extending knobbed surface portions of the resilient fingers. As a consequence, the lower frequency limit of the mechanically tunable frequency range is lowered to an appreciable extent.

In an additional embodiment of my invention, the plate line is provided with a tapered surface configuration so that the resilient fingers of the sliding line member are forced radially inward and outward as they ride over the surface of the plate line. This coaction is precisely the same as that outlined above and described in detatil in my copending application. The tapered grid sleeve and radially outwardly extending knobbed surface portions of the sliding line resilient fingers provided by the present invention coact to increase the lumped capacity at the free end of the grid sleeve and thereby reduce the lower limit of the tunable frequency range.

Figure 1:
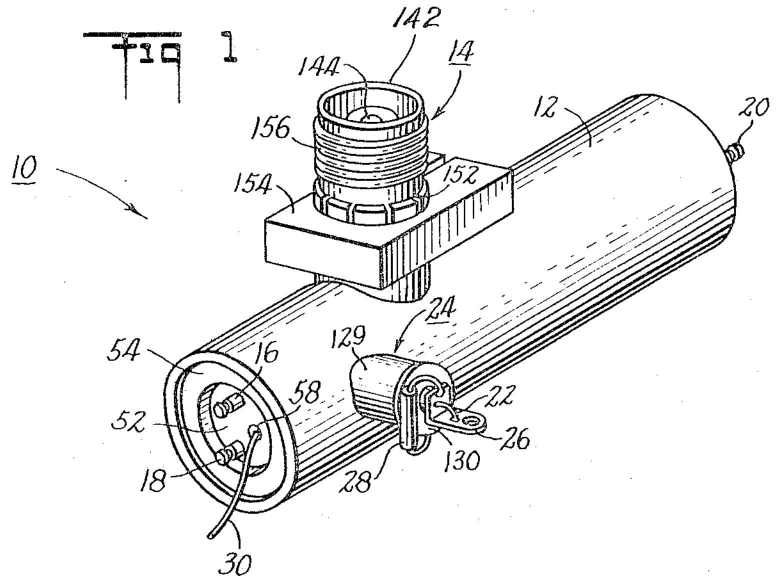
FIGURE 1 is a perspective view of a microwave source embodying my invention.

Referring now to FIGURE 1, a source 10, capable of oscillatory operation at X-band frequencies, includes a cylindrical outer shell or housing 12 formed from electrically conductive material, preferably brass. A coaxial output connector, indicated generally at 14, communicates with the interior of the housing 12 to provide means for coupling electromagnetic energy developed by the source 10 to an output load, not shown. A pair of filament terminals 16 and 18 extending from one end of the housing 12 facilitates external circuit connection to a filament supply source, not shown, while a plate terminal 20 extending from the other end of the housing 12 provides for external circuit connection to a suitable B+ voltage source, not shown.

Figure 2:
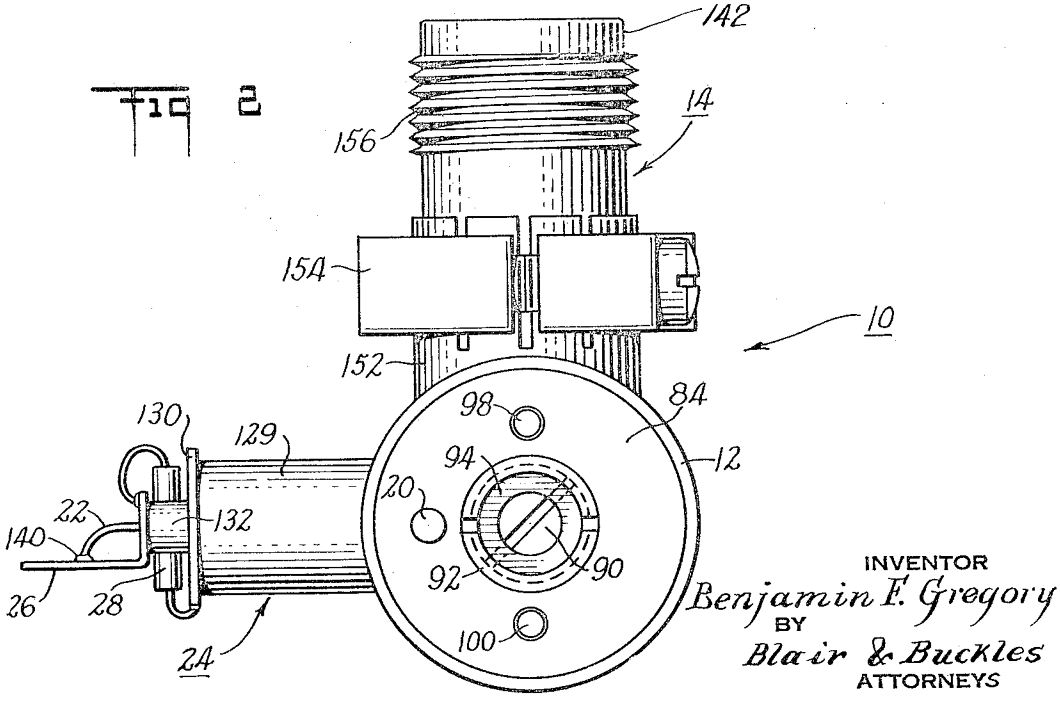
FIGURE 2 is an enlarged end elevational view of the microwave source of FIGURE 1.

Due to the small physical size of the source 10, wherein one specific physical embodiment the housing 12 measures ⅝ of an inch in diameter by 2 inches in length and weighs approximately 2 ounces, there is no available space within the housing 12 to accommodate a grid leak resistor. Moreover, normal installation of a grid lead resistor within the housing 12 would result in considerable attentuation of electromagnetic energy at X-band frequencies. Accordingly, and as also seen in FIGURE 2, a grid lead 22 is brought out from within the housing 12 through a quarterwave choke joint 24 for external circuit connection to a terminal member 26. The terminal 26 is, in turn, connected back to the housing 12, maintained at ground potential, through grid leak resistor 28. A cathode lead 30, electrically insulated from the housing 12, is brought out for external circuit connection to appropriately bias the source 10.

Figure 3:
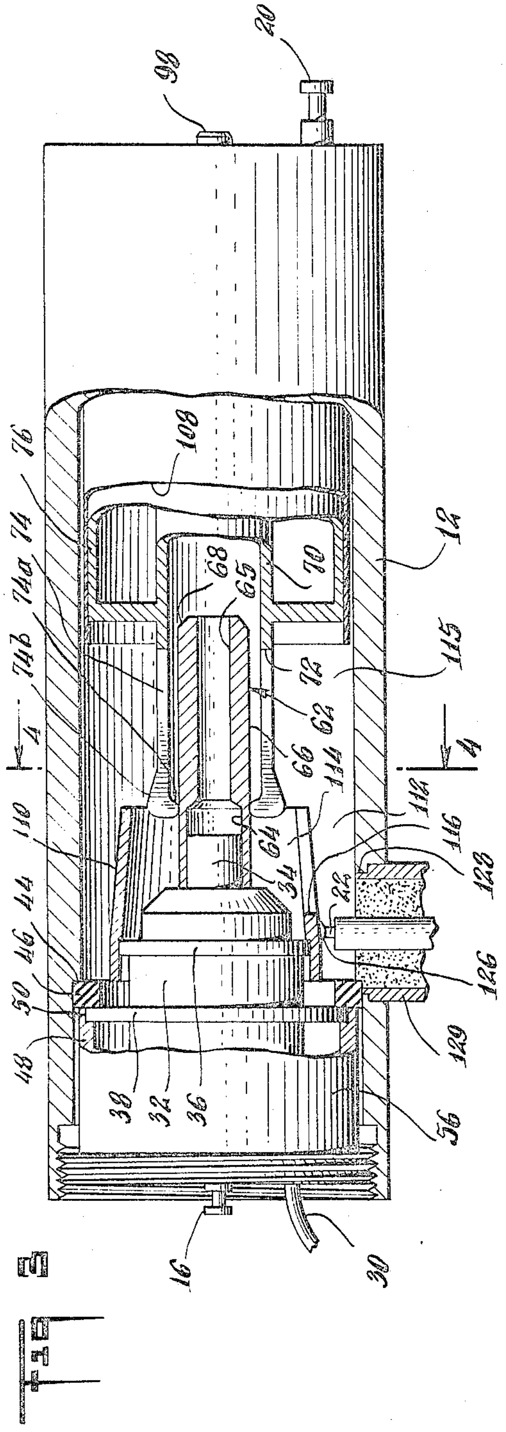
FIGURE 3 is a sectional side elevational view taken along line 3—3 of FIGURE 2.

As seen in FIGURE 3, a microwave triode 32, which may be a General Electric Y-1171 or its equivalent, is rigidly mounted concentrically within the housing 12. The triode 32 includes a plate pin 34, a grid ring 36, a cathode ring 38 and a pair of filament pins (not shown).

In order to rigidly mount the triode 32, an annular shoulder 44 is formed in the internal surface of the housing 12 at a point spaced from the lefthand end as seen in FIGURE 3. An annular spacer 46 of insulating material is seated against the shoulder 44. A cathode sleeve 48 of conductive material is provided with an internal annular recess 50 at one end for receipt of the cathode ring 38 of triode 32. The cathode sleeve 48 is affixed to the cathode ring 38 by any suitable means, such as solder. On insertion of the triode 32 into the open end of the housing 12, the cathode ring 38 along with the cathode sleeve 48 seat against the spacer 46.

As specifically shown in my copending application Serial No. 331,527, a filament block 52 of suitable insulative material such as phenolic, is inserted in the open end of cathode sleeve 48 and serves to retain filament pins in electrical contacting engagement with internal sockets formed in filament terminals 16 and 18 (FIGURE 1). The filament terminals 16 and 18 extend through spaced holes in filament block 52 and are thus maintained electrically insulated from each other. A tube retaining nut 54 (FIGURE 1) threaded into the end of housing 12, engages the cathode sleeve 48 and the filament block 52 to clamp the triode 32 in place.

In order to insulate the cathode sleeve 48 from the housing 12, the outer peripheral surface of the cathode sleeve 48 is covered with a layer 56 of insulative material such as terephthalate polyester, more commonly known as Mylar.

In the preferred manner of operation of the source 10, the cathode 38 of the triode 32 is floating, e.g., electrically insulated from the housing 12 at low frequencies or D.C., but grounded through the housing 12 at radio frequencies. As above described, the tube is rigidly mounted in the housing 12 and yet, is electrically insulated from the housing by the insulative spacer 46 and the insulative layer 56. However, due to the close spacing therebetween, the cathode sleeve 48 is effectively electrically connected by capacitive coupling to the housing 12 at radio frequencies.

The cathode sleeve 48 is of appropriate physical length so as to function as a quarter-wave choke joint to effectively contain the electromagnetic energy developed within the housing 12. External connection to the cathode ring 38 of triode 32 is effected by the cathode lead 30 which extends through a hole 58 in the filament block 52 (FIGURE 1) for electrical connection (not shown) to the cathode sleeve 48.

Referring to FIGURE 3, a plate line member 62 is provided with an internal bore 64 for receipt of the plate pin 34 of triode 32. The plate line member 62 is affixed in electrical contacting engagement with the plate pin 34 by any convenient means such as solder admitted through the reduced diameter bore 65. The outer peripheral surface of the plate line member 62 is formed having a cylindrical surface portion 66 and a beveled surface portion 68.

A tubular sliding line member 70 is formed with longitudinally extending slots 72 to define a number of resilient fingers 74 (seen also in FIGURE 4), making electrical contact with the plate line member 62. In particular, the free end of each resilient finger 74 is turned radially inwardly to form a contacting portion 74*a* mechanically biased into electrical contacting engagement with the plate line member 62 along its surface portion 66. In addition, the free end of each resilient finger 74 is integrally formed with a radially outwardly extending knob 74*b*. The beveled surface 68 of plate line member 62 serves to spread the resilient fingers 74 such that they will readily ride on to the surface portion 66 during initial assembly.

An annular tuning choke member 76 is affixed to the tubular sliding line member 70, such as by solder, at a point beyond the slots 72. An end plug 84 (FIGURE 2) formed of insulative material, is received in the open end of the housing 12 and retained in place by any suitable means. Preferably as specifically disclosed in my above-noted copending application, a tuning screw 90 (FIGURE 2) projects through a central aperture in the end plug 84 and into threaded engagement with a tuning lock nut (not shown) affixed to the end of the sliding line 70 remote from the fingers 74. An annular captive nut 92 (FIGURE 2) in threaded engagement with a counterbore in end plug 84 is advanced into engagement with a thrust washer 94 interposed between the head of tuning screw 90 and the captive nut 92.

As clearly seen in my copending application, rotation of the tuning screw 90, being in threaded engagement with the lock nut but constrained from axial movement by end plug 84, will cause conjunctive axial movement of the sliding line member 70 and the tuning choke 76. Once the longitudinal position of these two members is determined, the captive nut 92 is advanced inwardly thereby locking the tuning screw 90 against inadvertent rotational motion. In order to coaxially align the tuning choke 76 and the sliding line 70 and also prevent rotational movement thereof, a pair of guide rods 98 and 100 (FIGURE 2) are slidingly received in guide holes formed in the end plug 84. The inner ends of guide rods 98 and 100 are affixed to the tuning choke-sliding line assembly.

A plate lead conductor (not shown) provides circuit connection between the tuning choke-sliding line assembly and the plate external terminal 20 (FIGURES 1 and 2) which projects through and is mounted in end plug 84. Thus, a D.C. circuit path for the energization of the plate of the triode 32 is effected from terminal 20 through this conductor, sliding line 70, resilient fingers 74, and the plate line member 62 to the plate pin 34. The outer peripheral surface of the tuning choke 76 is covered with a continuous Mylar tape layer 108 to prevent direct electrical contact between these elements and the housing 12. Inasmuch as the end plug 84 is formed of insulative material, the D.C. path for the B+ energization circuit is fully insulated from the housing 12.

Still referring to FIGURE 3, a grid sleeve member 110 is concentrically mounted on triode 32 in electrical contacting engagement with the grid ring 36. The grid sleeve member 110 is inserted over the body of triode 32 and affixed to the grid ring 36 by any suitable means such as solder. According to an important feature of my invention, the grid sleeve 110 is tapered, i.e., truncated conically shaped.

The grid sleeve 110 defines, in combination with the housing 12, a distributed parameter circuit hereinafter referred to as the cathode coaxial line 112, and, in combination with the plate line member 62 and sliding line member 70, a second distributed parameter circuit hereinafter referred to as the plate coaxial line 114. Moreover, the free end of the grid sleeve 110 and the tuning choke 76 define a cathode-plate coaxial line 115 bounded by the housing 12 and the sliding line 70.

Figure 4:
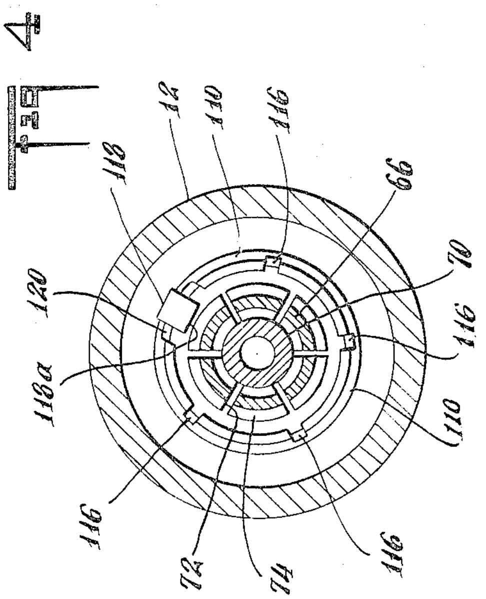
FIGURE 4 is a sectional end elevational view taken along line 4—4 of FIGURE 3.

As best seen in FIGURE 4, the grid sleeve member 110 is formed having a plurality of circumferentially spaced slots 116. The slots 116 extend from the free end of the grid sleeve 110 to a point adjacent the body of triode 32. A temperature responsive bimetallic strip 118 is disposed in an enlarged slot 120 formed in grid sleeve member 110. This longitudinally extending bimetallic strip 118 is affixed at one end to the grid sleeve member 110 at the closed end of the slot 120. The free end 118*a* of the bimetallic strip 118 is turned inwardly adjacent the free end of grid sleeve 110 and extends to a point in close proximity to the resilient fingers 74 integrally formed with the sliding line member 70.

As is well understood, when the ambient temperature increases, the various parts of the source 10 expand, decreasing the operating frequency. The bimetallic strip 118 deflects away from the sliding line 70 in response to increasing ambient temperatures. This results in a decrease in the lumped capacity between the inwardly turned end 118*a* of the strip. These offsetting effects on the operating frequency of the source 10 serve to hold the operating frequency substantially constant in spite of increases in ambient temperature. Decreases in ambient temperature normally causing the operating frequency to increase are similarly compensated by the bimetallic strip 118. The strip 118 then deflects toward the sliding line 70 to increase the lumped capacity between its end 118*a* and the fingers 74. Although only one bimetallic temperature compensating strip is disclosed herein, it will be appreciated that a plurality could be employed as disclosed in my above-noted copending application.

With reference to FIGURES 2 and 3, the insulated grid lead conductor 22 is electrically connected to the grid sleeve member 110 at point 126 by any suitable means such as solder. The grid lead is brought out through an opening 126 in housing 12 via the quarter-wave choke joint 24 for electrical connection to the terminal member 26. The quarter-wave choke joint 24 includes a conductive tubular member 129 mounted in opening 128 by any suitable means such as dipped brazing. A conductive end plate 130 closes off the outer end of member 129. The preferred construction of this quarter-wave choke joint is disclosed in detail in copending application Serial No. 331,527. As disclosed therein, the axial length of the tubular member 129 is such that it functions as a quarter-wave choke and thereby effectively prevents leakage of electromagnetic energy from the interior of the housing 12.

Considering FIGURES 1 and 2, the coaxial output connector 14 includes a cylindrical outer conductor 142 and a coaxial inner conductor 144 spaced apart by a suitable dielectric medium (not shown). One end of inner conductor 144 projects through an aperture into the interior of housing 12 for coupling of electromagnetic energy from the cathode coaxial line 112 (FIGURE 3). The output connector 14 is inserted in a sleeve 152 received in the housing aperture and affixed to the housing 12 by any suitable means such as dip brazing. As seen in FIGURE 2, the upper end of sleeve 152 is slotted in order that the output connector 14 may be clamped in place by means of clamp 154. The upper end of output connector 12 is provided with external threads 156 to facilitate connection to additional coaxial line for coupling the source 10 to an output load.

In accordance with the well-known theory of operation of reentrant oscillators the plate coaxial line 114, the cathode plate coaxial line 115 and the cathode coaxial line 112 are effectively connected in series by the grid sleeve 10 which, in the present embodiment, operates in the fundamental or quarter-wave mode. Thus, with appropriate supply voltages applied to the filament terminals 16, 18 and the plate terminal 20, electromagnetic energy delivered to the plate coaxial line 114 by the electron beam in the triode 32 is fed back by way of coaxial lines 115 and 112 for application across the grid terminal 36 and cathode terminal 38 in proper phase and amplitude to sustain oscillatory operation of the triode. A portion of this electromagnetic energy is coupled to an output load by way of the output connector 14.

In order to tune the source 10 to a desired continuous wave operating frequency, the tuning screw 90 is rotated, resulting in conjunctive axial movement of the tuning choke 76 and the sliding line member 70 (FIGURE 3). The axial position of the tuning choke 76 and the sliding line member 70 determine the physical dimensions of the cathode-plate coaxial line 115 and the plate coaxial line 114. The physical dimensions of these coaxial lines determine their distributed electrical parameters (characteristic impedance) which, in turn, establish the operating frequency of the source 10. Movement of the choke 76 and sliding line member 70 to the left as seen in FIGURE 3 reduces the dimensions of lines 115 and 114, thus increasing the operating frequency. On movement to the right as seen in FIGURE 3, the converse situation obtains.

According to a feature of my invention, the truncated conically shaped grid sleeve member 110 and the knobbed surface portion 74*b* of the sliding line resilient fingers 74 coact to extend the frequency tuning range achieved by manipulation of the tuning screw 90. This frequency tuning range extension is achieved primarily at the lower end of the tuning range. The truncated conically shaped grid sleeve member 110 serves to increase the concentration of lumped capacity in the plate coaxial line 114 at the free end of the grid sleeve member. This is due to the fact that the smaller diameter of the free end situates this portion of the grid sleeve member 110 in close proximity to the sliding line member 70. When the source 10 is tuned to its lowest possible operating frequency, the positional relationship of the various parts is substantially as shown in FIGURE 3. Thus, the knobbed surface portions 74*b* of the sliding line resilient fingers 74 are in substantial radial alignment with the free end of the grid sleeve member 110. As a consequence, the concentration of lumped capacity between the free end of the grid sleeve member 110 and the sliding line 70 is further enhanced by the presence of the knobbed surface portion 74*b* of each resilient finger 74. This substantial increase in the lumped capacity in the grid-plate coaxial line 114 provides for a substantial depression in the lower frequency limit of the operational frequency range.

It will be seen that as the tuning choke 76 and sliding line 70 are moved to the left from their positions shown in FIGURE 3 the knobbed surface portions 74*b* of the sliding line resilient fingers 74 move away from the free end of the grid sleeve member 110 thereby decreasing the lumped capacity in the grid-plate coaxial line 114. This causes the operating frequency of the source 10 to increase.

Figure 5:
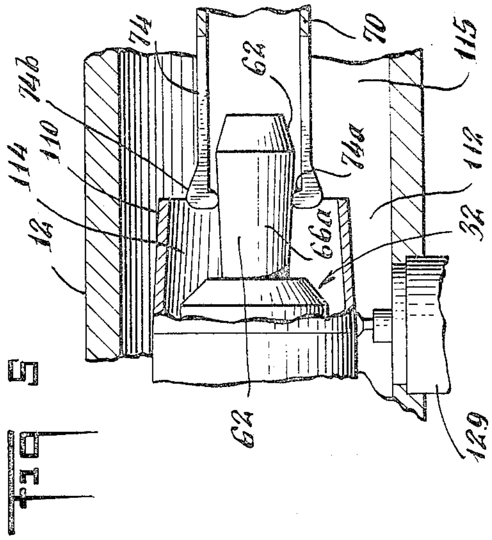
FIGURE 5 is a fragmentary sectional side elevational view illustrating an alternative construction of a portion of FIGURE 3.

As an alternative structural embodiment of my invention, the plate line 62 is formed with a tapered surface portion in the manner disclosed and claimed in my copending application, Serial No. 331,527. This construction is shown in FIGURE 5 of the drawings. The tuning operation is the same as described above except that the contacting portions 74*a* of the sliding line resilient fingers 74 ride over a tapered surface portion 66*a* of the plate line member 62. As a consequence, the resilient fingers 74 are spread radially outward as the sliding line 70 and tuning choke 76 are moved axially to decrease the operating frequency of the source 10. Conversely, as the sliding line 70 and tuning choke 76 move axially in the opposite direction, i.e., to the left as seen in FIGURE 5, the resilient fingers 74 radially converge to increase the operating frequency of the source 10.

I have found that by employing the truncated conically shaped grid sleeve member 110 in conjunction with the knobbed surface portion formed on the sliding line resilient fingers 74, the frequency tuning range is increased from approximately 8500 to 9600 megacycles. Without these structural features of my invention, the tuning range is typically from 9100 to 9600 megacycles. It will thus be seen that with my invention the effective tuning range is increased by a factor of 2. This was achieved by forming the grid sleeve 110 with a taper in the order of 4 to 6 degrees. A less startling increase in tuning range may be achieved without the knobbed surface portions 74*b* formed on the sliding line resilient fingers 74.

It will be seen that the extension of the tuning range is achieved without an extension of the range of axial movement of the tuning choke sliding line assembly. Less mechanical adjustment is therefore required to tune the source from one frequency to another. Thus, the microwave source constructed according to my invention may be tuned to different X-band frequencies more rapidly than heretofore possible.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A tunable microwave source comprising, in combination,
   (A) a substantially cylindrical electrically conductive housing,
   (B) a vacuum tube triode mounted within said housing and having cathode, grid and plate terminals,
      (1) said cathode terminal being directly connected to said housing,
   (C) a tapered grid sleeve mounted upon and electrically connected to said grid terminal in a position within said housing concentric about the cylindrical axis thereof,
      (1) said grid sleeve having a truncated conical configuration so as to situate a free and open end thereof on a smaller diameter than the remaining portion thereof,
   (D) means electrically connected to said plate terminal, said means comprising
      (1) a plate line member disposed coaxially within said grid sleeve, and
      (2) a sliding line electrically contacting said plate line and selectively axially movable to frequency tune said source.

2. The source defined in claim 1 wherein one end of said sliding line is formed with a radially outwardly extending surface portion coacting with the free end of said grid sleeve to concentrate a lumped capacity therebetween.

3. The source defined in claim 2 wherein said sliding line is formed with a plurality of fingers resiliently urged into sliding electrical contact with said plate line, said radially outwardly extending surface portion being formed adjacent the free ends of said fingers.

4. A tunable microwave source as in claim 1 wherein the plate terminal connecting means extends coaxially within said housing into the open end of said grid sleeve and,
   (1) defines in combination with said grid sleeve a distributed parameter electrical circuit,
   (2) is adapted for axial movement with respect to said grid sleeve so as to vary the physical dimensions of said distributed parameter circuit, and
   (3) includes a raised surface portion coacting with the open end of said grid sleeve to provide a lumped capacitive reactance in said distributed parameter circuit.

5. The device defined in claim 4 wherein said plate connecting means includes
   (4) a plate line member electrically connected to said plate terminal,
      (a) said plate line member having a tapered outer surface portion,
   (5) a tubular sliding line member arranged concentrically with said grid sleeve, said sliding line member being formed with a plurality of resilient fingers urged into engagement with said tapered surface portion
      (a) said raised surface portion carried by said resilient fingers adjacent free ends thereof
   (6) whereby movement of said sliding line member with respect to said plate line member causes variations in the spacing between said resilient fingers and said grid sleeve.

6. The device defined in claim 5 wherein a temperature compensating bimetallic strip is carried by said grid sleeve.

7. A tunable microwave source comprising in combination,
   (A) an electrically conductive housing including means for mounting therein a vacuum tube having cathode, grid and plate terminals,
      (1) said mounting means providing a direct electrical connection between the tube cathode terminal and said housing,
   (B) a centrally disposed electrically conductive member forming a plate line extending into said housing, but insulated therefrom, for establishing electrical connection with the tube plate terminal,
   (C) a slidable choke member of electrically conductive material insulatedly supported within said housing and movable along the plate line,
      (1) a plurality of spring contact fingers on said choke member and having enlarged end portions for slidably contacting the plate line,
   (D) a grid sleeve of electrically conductive material for mounting upon the tube grid terminal within said housing in a position surrounding but spaced from the plate line and the slidable spring contact fingers to form a distributive capacitive circuit therewith,
      (1) said grid sleeve being tapered toward its open end in closest proximity to the enlarged end portions of the slidable contact fingers, whereby a condition of maximum capacitive reactance is created between the contact fingers and the grid sleeve, and the reactance of this capacitive circuit is decreased upon sliding of the contact fingers further into the open end of the tapered grid sleeve.

8. A tunable microwave source as in claim 7 wherein, (B) the plate line at its end adjacent the tube is provided with a tapered surface sloping toward the tube plate terminal, whereby the decrease in capacitive reactance between the enlarged ends of the slidable fingers and the grid sleeve is at an increased rate as the slidable members are moved further into the open end of the grid sleeve.

9. A tunable microwave source as in claims 7 and 8 wherein the angle of taper is of the order of from four to six degrees.

References Cited by the Examiner

UNITED STATES PATENTS

| | | | |
|---|---|---|---|
| 2,424,089 | 7/1947 | Gethmann | 331—98 |
| 2,662,937 | 12/1953 | Horvath | 331—98 |
| 2,750,504 | 6/1956 | Sontheimer et al. | 331—98 |
| 3,173,106 | 3/1965 | McCulloch | 331—98 |

NATHAN KAUFMAN, *Primary Examiner.*

J. KOMINSKI, *Assistant Examiner.*